United States Patent
Takeuchi (10) Patent No.: US 6,516,269 B2
(45) Date of Patent: Feb. 4, 2003

(54) NAVIGATION APPARATUS FOR AND NAVIGATION METHOD OF ASSOCIATING TRAVELING OF MOVABLE BODY

(75) Inventor: Yoshikazu Takeuchi, Tsurugashima (JP)

(73) Assignee: Pioneer Corporation, Tokyo-to (JP)

(*) Notice: Subject to any disclaimer, the term of this patent is extended or adjusted under 35 U.S.C. 154(b) by 0 days.

(21) Appl. No.: 09/742,328

(22) Filed: Dec. 22, 2000

(65) Prior Publication Data

US 2001/0007089 A1 Jul. 5, 2001

(30) Foreign Application Priority Data

Dec. 24, 1999 (JP) .......................................... 11-367368

(51) Int. Cl.[7] .................................................. G06G 7/78
(52) U.S. Cl. ........................ 701/211; 701/213; 701/206; 701/207
(58) Field of Search ................................ 701/211, 207, 701/208, 117, 209, 210, 212, 200, 119, 206; 340/901, 903, 905, 991, 992, 995

(56) References Cited

U.S. PATENT DOCUMENTS

| 5,394,332 | A | * | 2/1995 | Kuwahara et al. | .......... 701/211 |
| 6,321,160 | B1 | * | 11/2001 | Takahashi | .................... 701/211 |
| 6,324,472 | B1 | * | 11/2001 | O'Shea | ........................ 701/211 |
| 6,333,702 | B1 | * | 12/2001 | Hiyokawa et al. | ........... 701/211 |
| 6,336,075 | B1 | * | 1/2002 | Park et al. | .................... 701/211 |

FOREIGN PATENT DOCUMENTS

JP 358208616 * 12/1983 ................. 701/211

* cited by examiner

Primary Examiner—Richard M. Camby
(74) Attorney, Agent, or Firm—Morgan, Lewis & Bockius LLP (57) ABSTRACT

A navigation apparatus which assists traveling of the movable body is provided. The navigation apparatus includes a position detecting device, a route setting device, and a sound outputting device. The position detecting device detects a current position of the movable body. The route setting device sets a route on which the movable body travels. Then the sound outputting device continuously outputs a sound corresponding to the route at least while the movable body is traveling along the route.

26 Claims, 8 Drawing Sheets

NAVIGATION APPARATUS FOR AND NAVIGATION METHOD OF ASSOCIATING TRAVELING OF MOVABLE BODY

BACKGROUND OF THE INVENTION

1. Field of the Invention

The present invention relates to the technical field of a navigation apparatus and a navigation method. To be more precise, the invention relates to the technical field of a navigation apparatus and a navigation method for movable bodies such as vehicles, which assists the users in locating places with an outputted sound.

2. Description of the Related Art

In recent years, navigation apparatuses for movable bodies such as vehicles, that assist the users to move from one place to another while displaying the map of a destination, etc., or outputting synthesized text-to-speech voice are widely used.

Conventionally, by way of assisting the users to move from one place to another using the synthesized voice in the navigation apparatuses, when a vehicle approaches a specific point which a driver of the vehicle should call attention to (for example, a point, an intersection, a destination, a railroad crossing, etc., where the driver previously programmed), an attention attracting sound like a beep sound, etc., is outputted, or the synthesized voice announces the fact that the vehicle approaches the specific point.

In addition, by detecting present position of the vehicle, displaying the map including the detected present position, and further displaying a position mark indicating the present position on the displayed map, the driver is informed the state of the vicinity of the present position.

However, the conventional announce by the attention attracting sound or the synthesized voice is conduced only when the vehicle approached the specific point, so that the attention might be insufficient.

On the other hand, in the case where the assistance is conducted by displaying the map, it is necessary for the driver to turn his eyes away from a forward view and to watch the map carefully while driving. Therefore that might make driving extremely dangerous.

SUMMARY OF THE INVENTION

It is therefore an object of the present invention to provide a navigation apparatus and a navigation method that can ensure calling the user's attention to the route on which he should travel, and can improve safety at the time of traveling.

The above object of the present invention can be achieved by a navigation apparatus which assists traveling of the movable body. The navigation apparatus is provided with: a position detecting device for detecting a current position of the movable body; a route setting device for setting a route on which the movable body travels; and a sound outputting device for continuously outputting a sound corresponding to the route at least while the movable body is traveling along the route.

According to the navigation apparatus of the present invention, the position detecting device detects a current position of the movable body. The route setting device sets a route on which the movable body travels. Then the sound outputting device continuously outputs a sound corresponding to the route at least while the movable body is traveling along the route.

Therefore, it is possible to ensure attracting attention to the route on which the movable body should travel. In addition, it is possible to grasp guidance performed by the navigation processing only based on the sense of hearing.

In one aspect of the navigation apparatus, the navigation apparatus further includes a sound storing device, a selecting condition setting device and a sound selecting device. The sound storing device stores various kinds of sounds. The selecting condition setting device sets a condition for selecting a sound to be outputted by the sound outputting device among the stored sounds. Then sound selecting device selects the sound when the condition set by the selecting condition setting device is satisfied.

According to this aspect, a user can freely select the sound to be outputted and make it output.

In another aspect of the navigation apparatus, the navigation apparatus further includes a outputting condition setting device for setting a condition for outputting a sound by the sound outputting device. Also, the sound outputting device continuously outputs the sound for a period of time during which the condition set by the outputting condition setting device is satisfied.

According to this aspect, the user can freely choose whether navigation operation accompanied by the sound is executed or not.

In another aspect of the navigation apparatus, the sound outputting device varies the sound in accordance with the current position detected by the position detecting device.

According to this aspect, the user can recognize which position the movable body exists based on his sense of hearing.

In another aspect of the navigation apparatus, the navigation apparatus further includes a road type detecting device for detecting a type of road including the detected current position. Also, the selecting condition setting device sets the condition that the detected type of road matches up with at least a predetermined type of road. Further, the sound selecting device selects the sound corresponding to the detected type of road.

According to this aspect, the user can recognize which road the movable body is traveling on based on his sense of hearing.

In another aspect of the navigation apparatus, the navigation apparatus further includes a road information detecting device for detecting information about road including the detected current position. Also, the selecting condition setting device sets the condition that the detected information about road matches up with at least a predetermined information about road. Further, the sound selecting device selects the sound corresponding to the detected information about road.

According to this aspect, attention to information about each road, such as a speed limit, a road where a speed should be reduced, etc., can be effectively attracted.

In another aspect of the navigation apparatus, the navigation apparatus further includes an area detecting device for detecting an area including the detected current position. Also, the selecting condition setting device sets the condition that the detected area matches up with at least a predetermined area. Further, the sound selecting device for selecting the sound corresponding to the detected area.

According to this aspect, the user can promptly recognize a character of the area, etc.

In another aspect of the navigation apparatus, the navigation apparatus further includes an intersection detecting device for detecting an intersection. Also, the selecting condition setting device sets the condition that the detected intersection is close to the detected current position. Further, the sound selecting device selects the sound attracting attention to the detected intersection.

According to this aspect, safety at the time the movable body travels in dangerous intersection can be improved.

In another aspect of the navigation apparatus, the navigation apparatus further includes a speed detecting device for detecting a speed of the movable body. Also, the selecting condition setting device sets the condition that the detected speed matches up with at least a predetermined speed. Further, the sound selecting device selects the sound corresponding to the detected speed.

According to this aspect, it is possible to effectively call the user's attention to an overspeed, etc.

In another aspect of the navigation apparatus, the navigation apparatus further includes an altitude detecting device for detecting an altitude of a place where the movable body exists. Also, the selecting condition setting device sets the condition that the detected altitude matches up with at least a predetermined altitude. Further, the sound selecting device selects the sound corresponding to the detected altitude.

According to this aspect, the user can recognize change of the height based on his sense of hearing.

In another aspect of the navigation apparatus, the navigation apparatus further includes a traveling azimuth detecting device for detecting a traveling azimuth of the movable body. Also, the selecting condition setting device sets the condition that the detected traveling azimuth matches up with at least a predetermined traveling azimuth. Further, the sound selecting device selects the sound corresponding to the detected traveling azimuth.

According to this aspect, the user can recognize which azimuth, four cardinal points, the vehicle is heading to, which azimuth a road leads (including determination whether a road is an up line or a down line) without watching any map based on his sense of hearing.

In another aspect of the navigation apparatus, the sound outputting device stops outputting the sound when the movable body is traveling off the route.

According to this aspect, the user can promptly recognize that the movable body is off the predetermined route.

The above object of the present invention can be achieved by a navigation method for assisting traveling of the movable body. The navigation method has the processes of: detecting a current position of the movable body; setting a route on which the movable body travels; and continuously outputting a sound corresponding to the route at least while the movable body is traveling along the route.

According to the navigation apparatus of the present invention, a current position of the movable body is detected. Also, a route on which the movable body travels is set. Then a sound corresponding to the route is continuously outputted at least while the movable body is traveling along the route.

Therefore, it is possible to ensure attracting attention to the route on which the movable body should travel. In addition, it is possible to grasp guidance performed by the navigation processing only based on the sense of hearing.

In one aspect of the navigation method, various kinds of sounds are stored. Then a sound to be outputted is selected among the stored sounds. Also, the sound is selected when the set condition is satisfied.

According to this aspect, a user can freely select the sound to be outputted and make it output.

In another aspect of the navigation method, a condition for outputting a sound is set. Also, the sound is continuously outputted for a period of time during which the set condition set is satisfied.

According to this aspect, the user can freely choose whether navigation operation accompanied by the sound is executed or not.

In another aspect of the navigation method, the sound is varied in accordance with the detected current position.

According to this aspect, the user can recognize which position the movable body exists based on his sense of hearing.

In another aspect of the navigation method, a type of road including the detected current position is detected. Also, the condition that the detected type of road matches up with at least a predetermined type of road is set. Further, the sound corresponding to the detected type of road is selected.

According to this aspect, the user can recognize which road the movable body is traveling on based on his sense of hearing.

In another aspect of the navigation method, information about road including the detected current position is detected. Also, the condition that the detected information about road matches up with at least a predetermined information about road is set. Further, the sound corresponding to the detected information about road is selected.

According to this aspect, attention to information about each road, such as a speed limit, a road where a speed should be reduced, etc., can be effectively attracted.

In another aspect of the navigation apparatus, an area including the detected current position is detected. Also, the condition that the detected area matches up with at least a predetermined area is set. Further, the sound corresponding to the detected area is selected.

According to this aspect, the user can promptly recognize a character of the area, etc.

In another aspect of the navigation method, an intersection is detected. Also, the condition that the detected intersection is close to the detected current position is set. Further, the sound attracting attention to the detected intersection is selected.

According to this aspect, safety at the time the movable body travels in dangerous intersection can be improved.

In another aspect of the navigation method, a speed of the movable body is detected. Also, the condition that the detected speed matches up with at least a predetermined speed is set. Further, the sound corresponding to the detected speed is selected.

According to this aspect, it is possible to effectively call the user's attention to an overspeed, etc.

In another aspect of the navigation method, an altitude of a place where the movable body exists is detected. Also, the condition that the detected altitude matches up with at least a predetermined altitude is set. Further, the sound corresponding to the detected altitude is selected.

According to this aspect, the user can recognize change of the height based on his sense of hearing.

In another aspect of the navigation method, a traveling azimuth of the movable body is detected. Also, the condition that the detected traveling azimuth matches up with at least a predetermined traveling azimuth is set. Further, the sound corresponding to the detected traveling azimuth is selected.

According to this aspect, the user can recognize which azimuth, four cardinal points, the vehicle is heading to, which azimuth a road leads (including determination whether a road is an up line or a down line) without watching any map based on his sense of hearing.

In another aspect of the navigation method, outputting of the sound is stopped when the movable body is traveling off the route.

According to this aspect, the user can promptly recognize that the movable body is off the predetermined route.

DETAILED DESCRIPTION OF THE PREFERRED EMBODIMENTS

The preferred embodiments of the present invention will be explained referring to the drawings.

The preferred embodiment described below is an embodiment in which the present invention is applied to an information recording/reproducing device installed in a vehicle, which can reproduce music information recorded on a CD, etc. in the vehicle, and simultaneously copy the music information onto a hard disc in a HD (hard disc) drive in the vehicle. In addition, the information recording/reproducing device can perform navigating operation so that it assists the user of the vehicle to move from one place to another while displaying a map, etc.

First, the constitution and operation of the information recording/reproducing device having the function for the navigating operation according to the present invention will be described with reference to FIG. 1.

Figure 1:
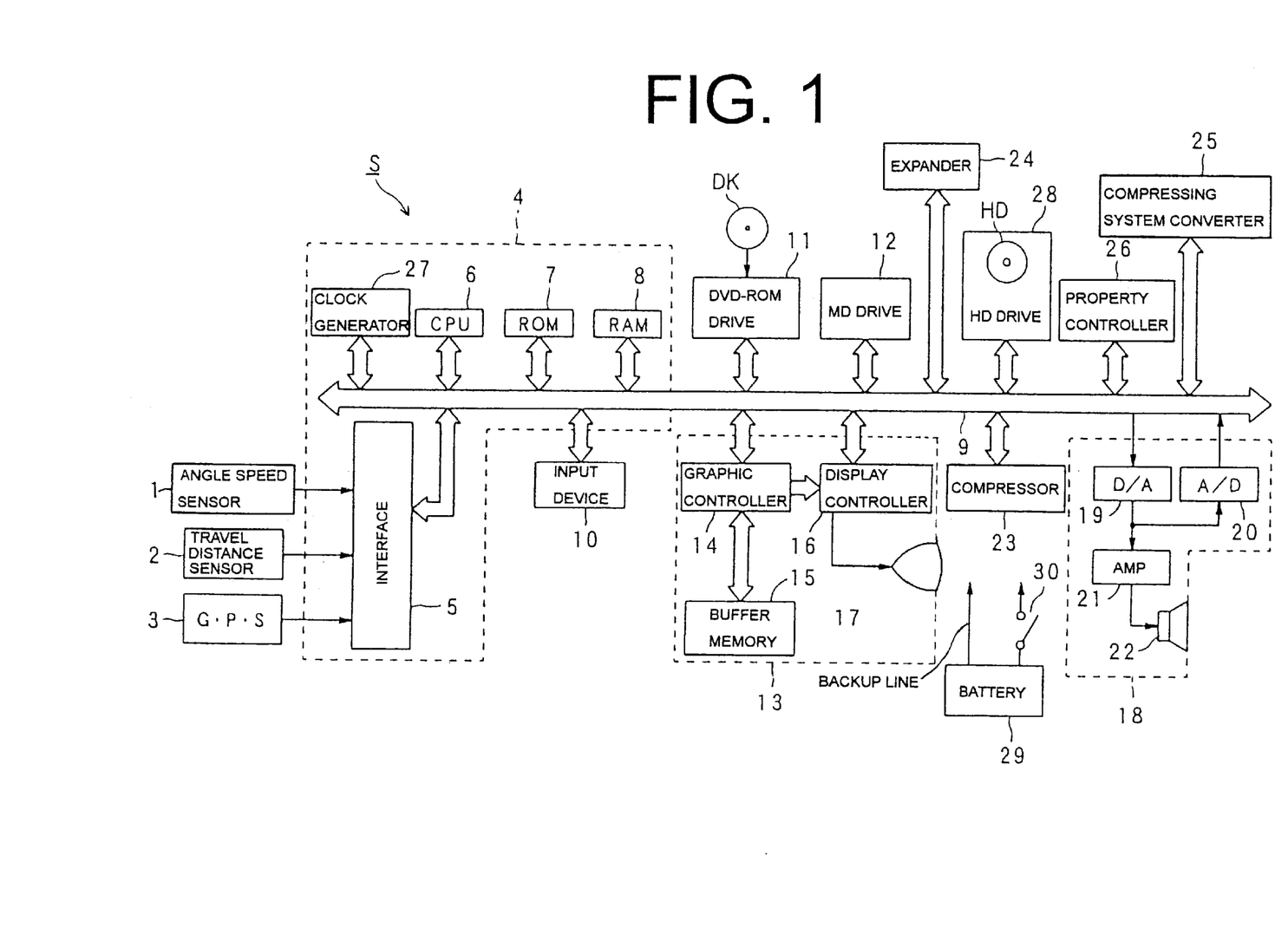
FIG. 1 is a block diagram showing outline constitution of the information recording/reproducing device in relation to the preferred embodiment.

FIG. 1 is a block diagram showing outline constitution of the information recording/reproducing device.

As shown in FIG. 1, the information recording/reproducing device S of the preferred embodiment includes: an angle speed sensor 1 detecting an angle speed at the time of changing directions of the vehicle and outputting an angle speed data and a relative azimuth data; a travel distance sensor 2 calculating the number of pulses per rotation of the wheel by counting the number of pulses emitted as pulse signals resulted from the rotation of the wheels and outputting travel distance data based on the number of pulses per rotation; a GPS (Global Positioning System) receiver 3 receiving a radio wave from a GPS satellite and outputting GPS measuring data as well as absolute azimuth data; a system controller 4 detecting the position of the vehicle and controlling navigating function and the information recording/reproducing device S as a whole; and an input device 10 such as a remote controller device, etc. used to enter various data.

Further, the information recording/reproducing device S includes: a DVD-ROM drive 11 reading map information, information relating to roads (including road data indicating each road itself), and music information outputted at the time of executing navigation processing described below from the DVD-ROM disk DK previously storing the map information, the information relating to roads and the music information, and outputting it; an MD drive 12 reading music information from an MD (Mini Disc) mainly storing the music information in advance and outputting it; a display unit 13 displaying various display data, such as a setting screen described below, etc., under control of the system controller 4; a sound reproducing unit 18 reproducing various music information described below, audio information necessary to the navigation processing, etc., and outputting it; a compressor 23 compressing (encoding) the music information reproduced by each drive in MPEG (Moving Picture Experts Group) system or ATRAC (Adaptive Transform Acoustic Coding) system; an expander 24 expanding (decoding) the compressed music information; a compressing system converter 25 converting a compressing system of the music information into the other compressing system; a property converter converting the number of channel or the number of a sampling frequency of the music information into the other one; a HD (Hard Disk) drive 28 storing (copying) the map information or the music information in a built-in hard disk; a battery 29 providing electric power to each of the above-mentioned components.

The system controller 4 has the interface 5 operating as an interface with external sensors such as GPS receiver 3, etc.; the CPU 6 controlling the system controller 4 as a whole; a ROM 7 in which basic control program, etc., to control the system controller 4 is stored; a RAM (Random Access Memory) 8 including nonvolatile storage not shown in the figure, a buffer memory described below, etc., and temporarily storing system setting information, etc. which the users presets using the input device 10 to be read; and a clock generator 27 clocking current time based on time data from the GPS satellite received especially in the GPS receiver 3. The system controller 4 is connected to the input device 10, the DVD-ROM drive 11, the MD drive 12, the display unit 13, the sound reproducing unit 18, the compressor 21, the expander 24, the compressing system converter 25, the property converter 26 and the HD drive 28 via a bus line 9.

Also, the display unit 13 includes: a graphic controller 14 controlling the display unit 13 as a whole based on the control data sent via the bus line 9 from the CPU 6; a buffer memory 15 comprising memories, such as a VRAM (Video RAM), etc., and temporarily storing image information that could be displayed immediately; and a display controller 16 controlling a display 17, such as a liquid crystal panel, a CRT (Cathode Ray Tube), etc., based on the image data outputted from the graphic controller 14.

The sound reproducing unit 18 includes: a D/A (Digital/Analog) converter 19 converting digital data (voice digital data for navigation or the music information) sent via the bus line 9 from the DVD-ROM drive 11, the RAM 8, etc., into analog data; an A/D converter 20 converting analog signals outputted from the D/A converter 19; an amplifier 21 amplifying the analog signals outputted from the D/A converter 19; and a speaker 22 converting the amplified analog signals into sounds to be outputted in a vehicle.

Moreover, the battery 29 provides two electric power systems comprising a main power supply system provided through so-called an ACC (Accessory) switch 30 installed in a room of the vehicle, and a backup system always connected to the battery 29 and used for storing the last operating state of each component when the ACC switch is turned off.

The DVD-ROM drive 11 detects each tune from a DVD audio disc not shown in the figures, decoding it, reproducing it, and outputting it to the compressor 23, the HD drive 28, or the sound reproducing unit 18 when the DVD audio disc storing music information comprising a plurality of tunes is loaded into the DVD-ROM drive 11.

The DVD-ROM drive 11 has compatibility that it can reproduce each tune from a CD-ROM or a CD storing the music information.

At the time of navigation processing, the information recording/reproducing device S performs: display processing so that it reads map information stored in the DVD-ROM disc DK from the DVD-ROM drive 11 and outputs it to the display 17; and route guiding processing or map-matching processing described below. Also, the information recording/reproducing device S transmits map information, etc., necessary to the navigation processing (including map information, road information or music information necessary to the navigation processing) from the DVD-ROM disc DK to the hard disc HD and stores it in the hard disc HD at the predetermined timing. At this time, the transmission of the map information, etc., is performed by using each map data as an object in an area selected according to the prescribed conditions base on the position of the vehicle.

The map information, etc., stored in the hard disc HD once, is being stored unless it is deleted. After that, the map information, etc., is read through the HD drive 28 from the hard disc HD instead of the DVD-ROM disc DK to perform the navigation processing. The hard disc HD can store both of music information and map information for navigation.

Next, the navigation processing of the present invention performed in the information recording/reproducing device S shown in FIG. 1 will be described with reference to FIGS. 2 to 7.

In the navigation processing described below, while performing the processing of displaying the current position, music or sound having a melody (hereinafter simply referred to melody) is continuously reproduced and outputted in the vehicle according to types of roads or road information, such as the numbers of the roads, etc., where the vehicle currently exists. Also, while performing the route guiding processing described below, the melody is reproduced and outputted in the vehicle when the vehicle is moving on planned route.

[I] The Processing of Setting Contents of Output of the Melody

First, the processing of setting contents of output of the melody, which associates types of melodies to be reproduced and outputted with the navigation processing, will be described with reference to FIGS. 2 to 5, before describing the processing of reproducing and outputting the melody in the actual navigation processing.

Figure 2:
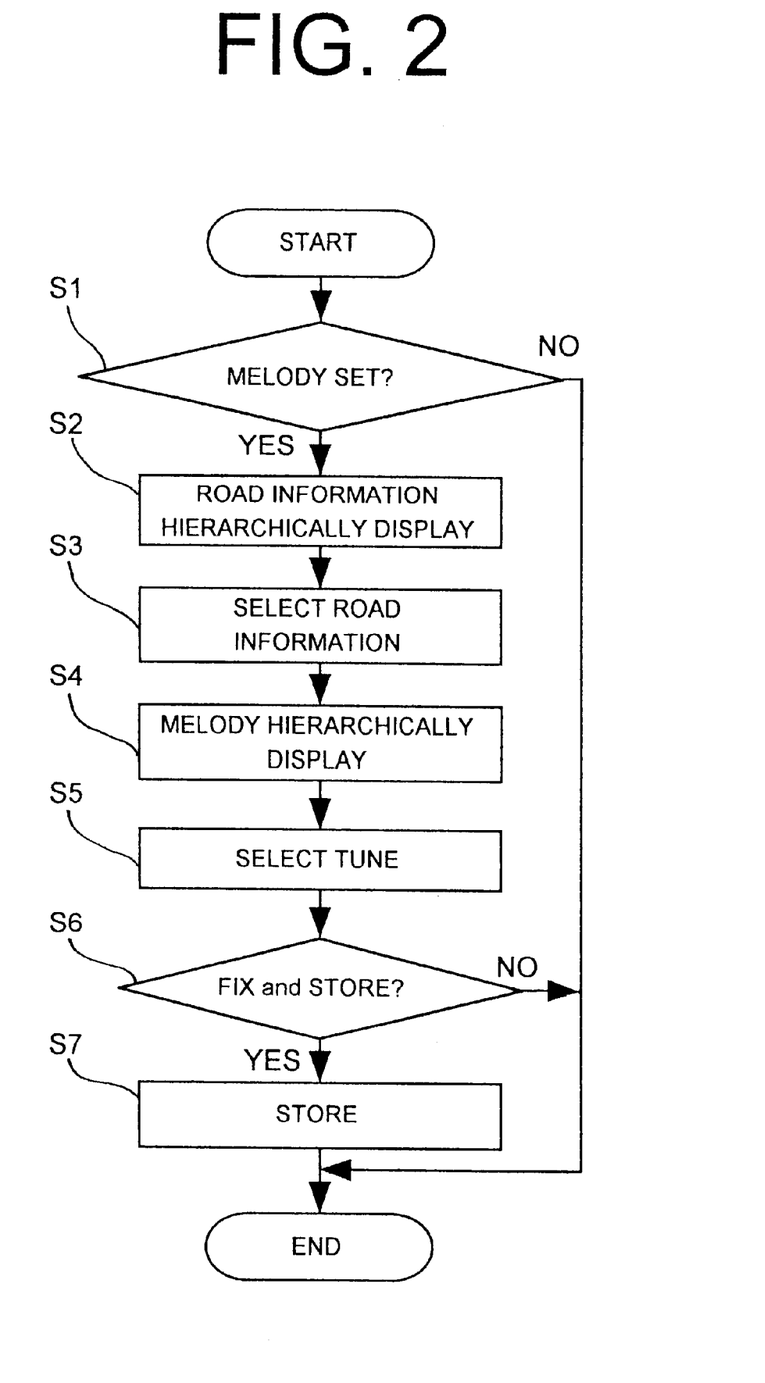
FIG. 2 is a flowchart showing the processing of setting of associating the contents of melodies with the road information corresponding to the melodies.
Figure 3A:
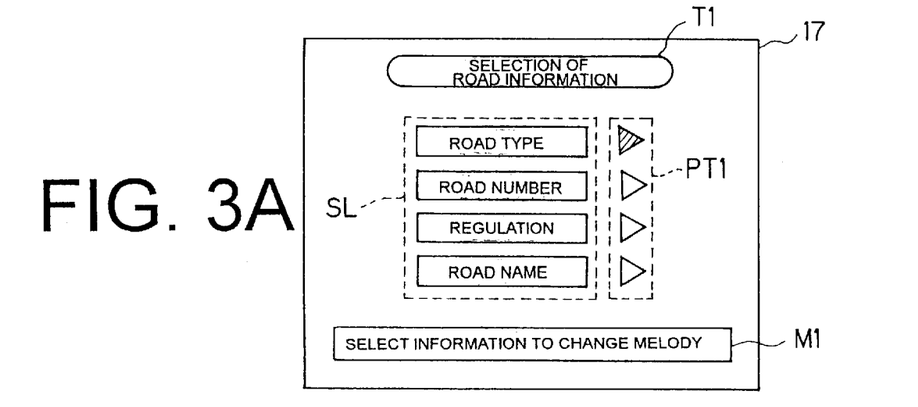
FIG. 3A is a view of an example of a screen displayed at the time of the setting of associating the contents of melodies with the road information corresponding to the melodies (No. 1)
Figure 3B:
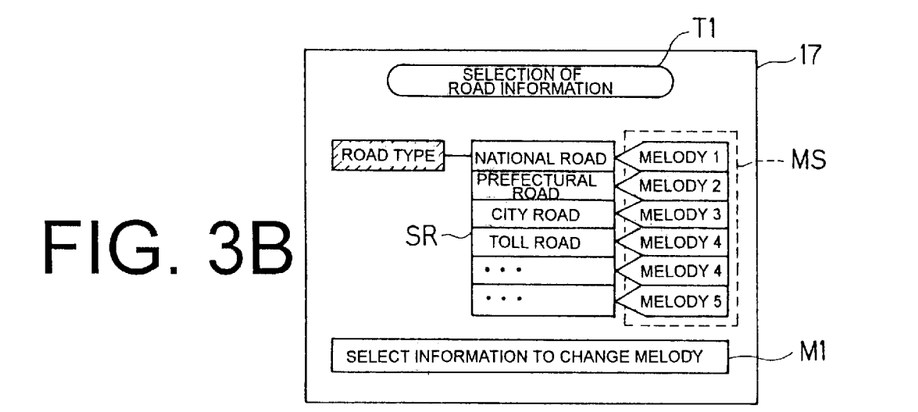
FIG. 3B is a view of an example of a screen displayed at the time of the setting of associating the contents of melodies with the road information corresponding to the melodies (No. 2)
Figure 3C:
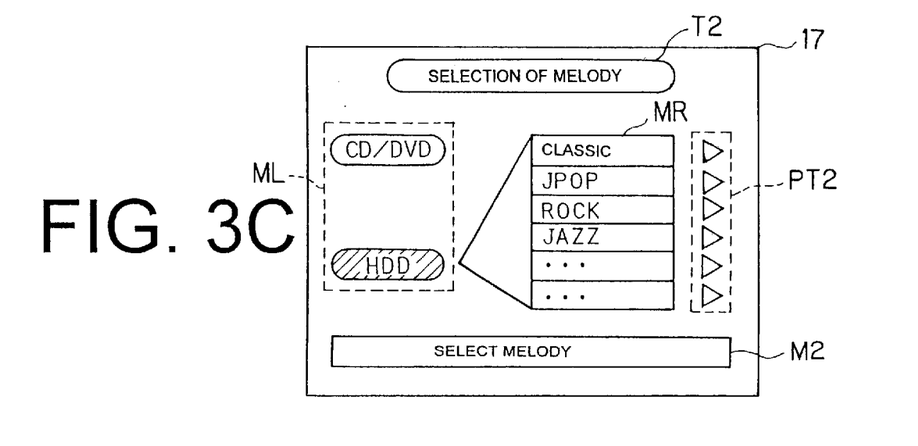
FIG. 3C is a view of an example of a screen displayed at the time of the setting of associating the contents of melodies with the road information corresponding to the melodies (No. 3)
Figure 4:
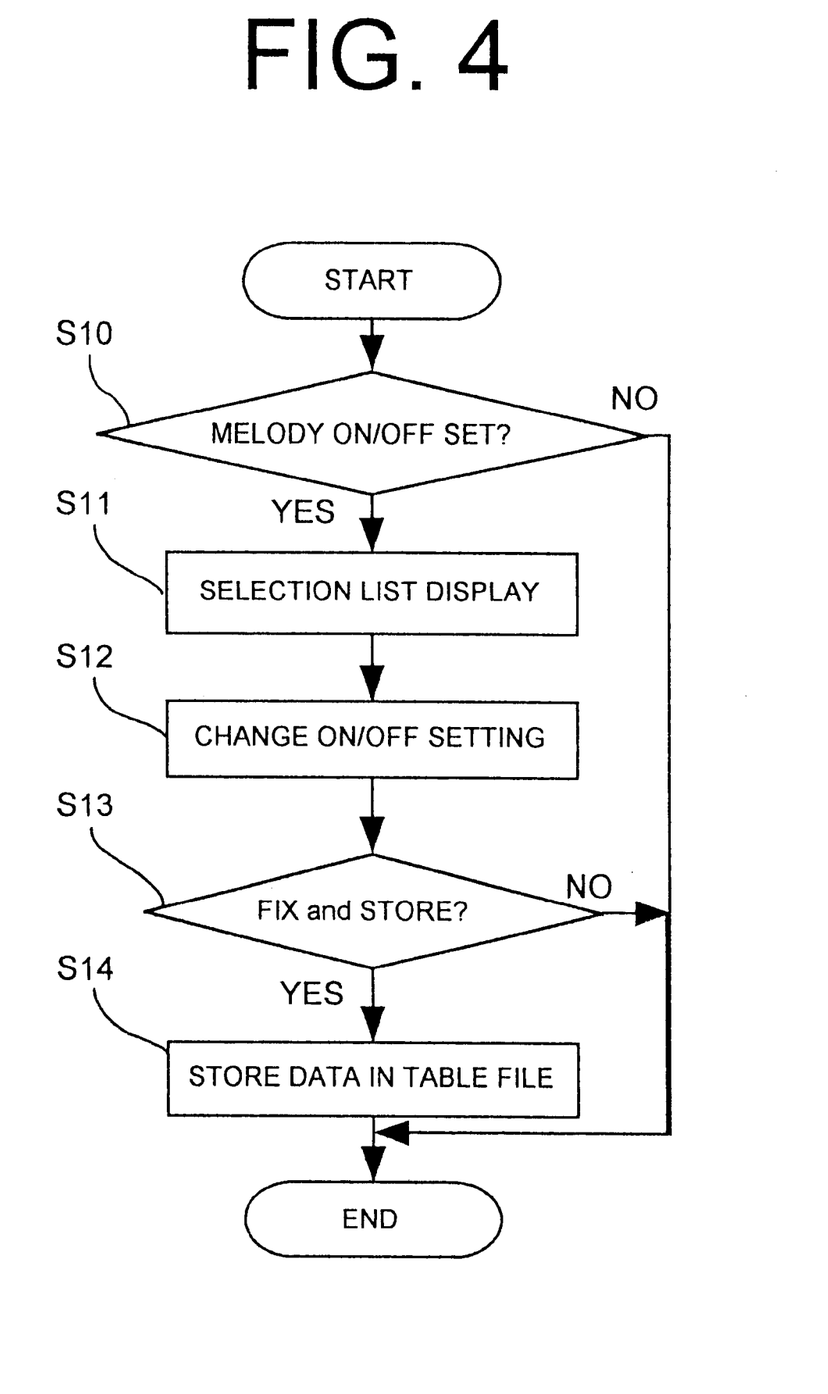
FIG. 4 is a flowchart showing the processing of ON/OFF setting of reproducing and outputting the melody.
Figure 5:
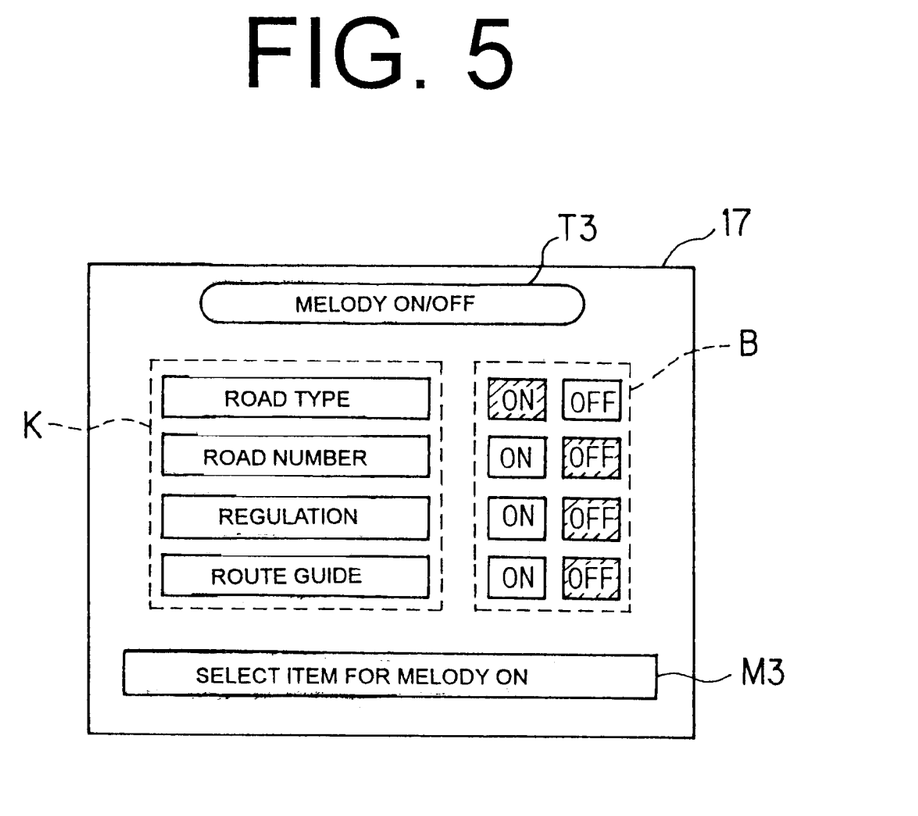
FIG. 5 is a view of an example of a screen displayed at the time when the processing of ON/OFF setting of reproducing and outputting the melody is executed.

FIG. 2 is a flowchart showing the processing of setting of associating the contents of melodies with the road information to the melodies. FIG. 3 is a view of an example of a screen displayed on the display 17 at the time of the setting. FIG. 4 is a flowchart showing the processing of selecting whether the associated melodies are actually outputted or not. FIG. 5 is a view of an example of a screen displayed on the display 17 at the time when the processing shown in FIG. 4 is performed.

First, the processing of setting of associating the contents of melodies with the road information corresponding to the melodies will be explained with reference to FIGS. 2 and 3.

As shown in FIG. 2, if the contents of the melodies to be outputted are associated with the corresponding road information, a prescribed inquiring screen inquires of a user whether he sets conditions, etc., for associating of the contents of melodies with the road information before or while driving is displayed on the display 17 (Step S1). Then if the setting is not executed (Step S1; NO), the processing is ended. On the other hand, if the setting is executed (Step S1; YES), the road information associated with the melodies to be outputted is hierarchically displayed on the display 17 (Step S2).

In the step S2, the screen image displayed first on the display 17 includes: for example, as shown in FIG. 3A, a title display T1 indicating the processing performed by using the screen image (in the step S2, the processing of selecting road information associated with the melodies); information display SL indicating primary headings of the road information with which the melodies are associated; a pointer group display PT1 including each pointer corresponding to each primary heading for displaying each subordinate heading, which is included in each primary heading in the information display SL, on another screen; an instruction display M1 specifically indicating processing to let the user perform.

The primary headings in the information display SL include: a road-type-heading including the road types, for example, such as a national road, a prefectural road, a city road, etc.; a road-number-heading including the number of the national road (the number at "Route xx"); a road-regulation-heading including a regulation in each road, such as a speed limit, reduced speed, etc.; a road-name-heading including a specific name (common name) of a road, such as "Loop 8", "Meiji Avenue", etc.

If any pointer in the pointer group display PT1 shown in FIG. 3A is selected in the step S2 (FIG. 3A shows the state of the screen in which the pointer corresponding to the road-types-heading is selected), subordinate headings included in the road-types-heading is displayed as shown in FIG. 3B.

At this time, in FIG. 3B, in addition to the title display T1 and the instruction display M1, subordinate heading group display SR including a plurality of subordinate headings indicating the road types such as a national road, a prefectural road, a city road, a toll road, etc., included in the road-species-heading, and melody name group display MS including a plurality of names of melodies corresponding to subordinate headings respectively, are displayed so that a one-to-one correspondence between them can be readable.

Then, the road information, in which the contents of current setting of a melody should be changed, is selected in the screen shown in FIG. 3A or 3B by the user (Step S3). At this time, in FIG. 3B, any subordinate heading shown in the subordinate heading group display SR is selected by an operation on the input device 10.

If the road information in which the contents of current setting of a melody should be changed is selected, the contents of melodies previously recorded in the hard disc HD or the DVD-ROM disc DK are hierarchically displayed as in the case of the road information to let the user select a melody itself (Step S4).

In the step S4, the screen image displayed first on the display 17 includes: for example, as shown in FIG. 3C, a title display T2 indicating the processing performed by using the screen image (in the step S4, the processing of selecting a melody with which the selected road information is associated); information recording medium group display ML including information recording mediums in which the melodies are recorded (in FIG. 3C, the DVD-ROM disc DK loaded in the DVD-ROM drive 11, a CD, a DVD audio disc, the hard disc HD, etc.); a melody group display MR including a plurality of categories (genres) of melodies included in information recording mediums respectively; a pointer group display PT2 including each pointer corresponding to each category for displaying each specific name of each melody (tune) further included in subordinate layer of each category in the melody group display MR; and an instruction display M2 specifically indicating processing to let the user perform. FIG. 3C shows the state of the screen in which the categories of melodies recorded in the hard disc HD are displayed.

The categories in the melody group display MR includes, for example, Classic, Japanese Pops (JPOP) Rock, Jazz, etc.

Each road information and each tune data of each melody are respectively recorded in separate recording areas of an information recording medium. Related information in the form of a table indicating correspondences between each road information and each tune data of each melody is recorded as so-called table file in the hard disc HD. In addition to related information, flags indicating whether the melodies associated with the road information as described below are actually outputted or not are also stored in the table file.

As for the recording forms of the above-mentioned road information, the tune data, and the table file, specifically, the road information and the tune data can be recorded in the DVD-ROM disc Dk, and the table file can be recorded in the hard disc HD. Also, only road information can be recorded in the DVD-ROM disc DK, and the tune data and the table file can be recorded in the hard disc HD. Further, part of the tune data and the road information can be recorded in the DVD-ROM disc Dk, and the rest of the tune data and the table file can be recorded in the hard disc HD.

Then a melody (tune) which should be newly associated with the selected road information is selected in the screen as shown in FIG. 3C by the user's operation on the input device 10 (Step S5).

Then if the melody is selected, it is confirmed whether the contents of selecting (the contents of the road information and associated melody) are fixed and stored or not (Step S6). If the contents are not stored while different association is newly selected (Step S6; NO), the processing of setting of associating the contents of melodies with the road information is ended. If the contents are stored (Step S6; YES), the contents of a table in the table file is replaced with the contents selected in the Step S5 (Step S7), and the processing of setting of associating the contents of melodies with the road information is ended.

Next, the processing of ON/OFF setting, which sets whether the associated melody is actually outputted or not, will be described with reference to FIGS. 4 and 5. If "ON" is selected, the associated melody is actually outputted. If "OFF" is selected, the associated melody is not outputted.

As shown in FIG. 4, if the ON/OFF setting is executed, a prescribed inquiring screen inquires of the user whether he selects ON/OFF of the melody before or while driving is displayed on the display 17 (Step S10). Then if the ON/OFF setting is not executed (Step S10; NO), the processing is ended. On the other hand, if the ON/OFF setting is executed (Step S10; YES), a selection list used for the ON/OFF setting is displayed on the display 17 (Step S11).

In the step S1, the screen image of the selection list displayed on the display 17 includes: for example, as shown in FIG. 5, a title display T3 indicating the processing performed by using the screen image (in the step S11, the processing of ON/OFF setting of the melody); information display K indicating the road information or navigation processing in which "ON" or "OFF" is selected; a button group display B including ON selecting buttons and OFF selecting buttons every road information or navigation processing for selecting "ON" or "OFF" of the melody every road information or navigation processing included in the information display K; an instruction display M3 specifically indicating processing to let the user perform.

Alternatives included in the information display K include the road types, the road number, and the road regulation, which correspond to the contents of the information display SL shown in FIG. 3A, and the route guide in which the melody is outputted while the vehicle is moving on a predetermined route.

Then, the contents of the ON/OFF setting for current melodies are changed in the screen as shown in FIG. 5 by the user (Step S12). In FIG. 5, any button shown as the button group display B is selected by the user's operation on the input device 10, so that the contents are changed.

In FIG. 5, only output of a melody corresponding to the road species is set for "ON." If output of a melody corresponding to the route guide is set for "ON," it is possible to control the other button so that all outputs of melodies corresponding to the other alternatives in FIG. 5 are automatically set for "OFF" to give a high priority to output the melody with which route guide processing described below is accompanied.

Then, it is confirmed whether the changed contents (the contents of the ON/OFF setting) are fixed and stored or not (Step S13). If the different ON/OFF setting is newly performed so that the changed contents is not stored (Step S13; NO), the processing of ON/OFF setting is ended. If the changed contents is stored (Step S13; YES), the contents of a table in the table file is rewritten with the changed contents in the Step S12 (Step S14).

[II] The Processing of Reproducing and Outputting the Melody with which the Processing of Displaying the Current Position is Accompanied Next, the processing of reproducing and outputting the melody by which the processing of displaying the current position is accompanied, which is performed as navigation processing will be described with reference to FIGS. 6 and 7.

Figure 6:
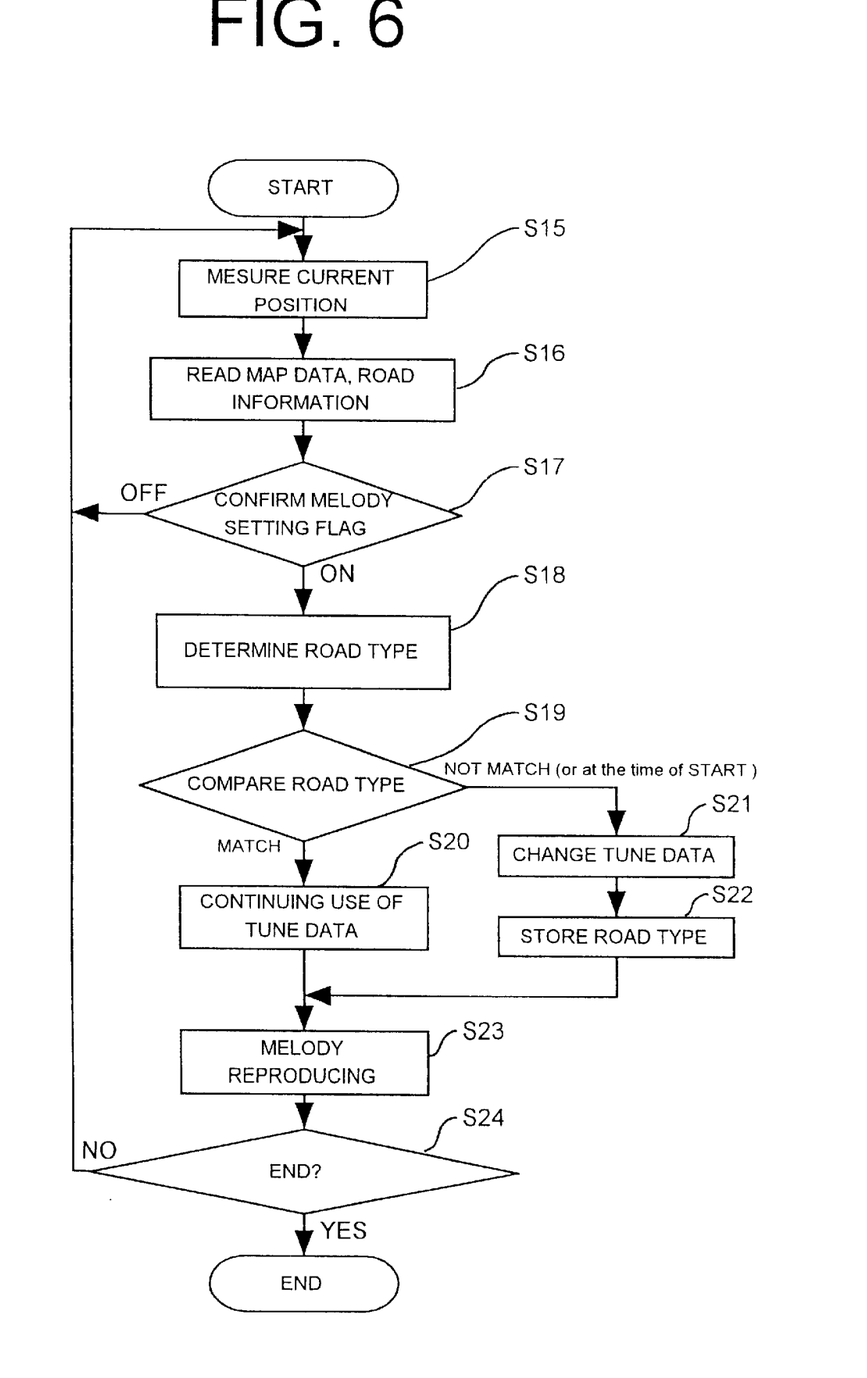
FIG. 6 is a flowchart showing the processing of displaying the current position.

FIG. 6 is a flowchart showing the processing of displaying the current position. FIG. 7 is a flowchart showing the processing of reproducing and outputting the melody in detail.

As shown in FIG. 6, in the processing of reproducing and outputting the melody by which the processing of displaying the current position is accompanied, first, measuring the current position of the vehicle is executed (Step S15). Specifically, the processing of measuring the current position is executed on the basis of the angle speed data and the relative azimuth data outputted from the angle speed sensor 1, the travel distance data outputted from the travel distance sensor 2, and the GPS measuring data and the absolute azimuth data, mainly by the CPU 6.

If the current position is measured, then the map data and the road information data corresponding to the road including the measured current position (namely, the road where the vehicle having the information recording/reproducing device S is currently travelling) is read from the DVD-ROM disc DK or the hard disc HD by the DVD-ROM drive 11 or the HD drive 28 (Step S16).

Then it is determined whether the fact that the melody corresponding to the road types (see FIG. 3A and related explanation) indicating the read road is outputted is set by the processing shown in FIGS. 4 and 5, and is recorded in the table file as a flag or not (Step S17).

If the flag, which indicates that the melody corresponding to the road types indicating the road including the current position is outputted, is off (namely, setting that the melody is outputted is not performed) (Step S17; OFF), the processing is returned to that of the Step S15, so that the measuring of the current position is executed and subsequent processing is executed. On the other hand, if the flag is on (Step S17; ON), it is determined to which road types the current position belongs (Step S18). Further, the road types including the current position determined at this time is compared with the last road types determined in the processing shown in FIG. 6 (namely, the road types including the current position of the vehicle at the time of the last processing shown in FIG. 6) (Step S19).

If both road types match up with each other (Step S19; MATCH), data for the melody used for outputting the melody having been executed until that moment is continuously used as it is (Step S20). Then the melody is reproduced (Step S23).

After that, it is determined whether the fact that the navigation processing which includes the processing of displaying the current position is ended is instructed on the input device 10 or not (Step S24). If the fact is instructed (Step S24; YES), the navigation processing is ended. On the other hand, if the fact is not instructed (Step S24; NO), returning to the Step S15 again, and the above-mentioned processing is repeated.

On the other hand, in the determination of the Step S19, if the road types including the current position determined at this time does not match up with the last road types (Step S19; NOT MATCH. It is noted that it is determined the road types does not match up with the last road types in the Step S19 even at the time the vehicle starts.), the tune data for outputting the melody is replaced with the tune data set so as to correspond to the road types determined in the Step S18 (see FIGS. 2 and 3) (Step S21). Then, the current road types are stored for the determination in the Step S19 of the next processing shown in FIG. 6 which is going to be executed after that (Step S22). Then the processing goes to that of Step S23.

Next, the processing of reproducing and outputting the melody in the Step S23 will be described in detail with reference to FIG. 7.

Figure 7:
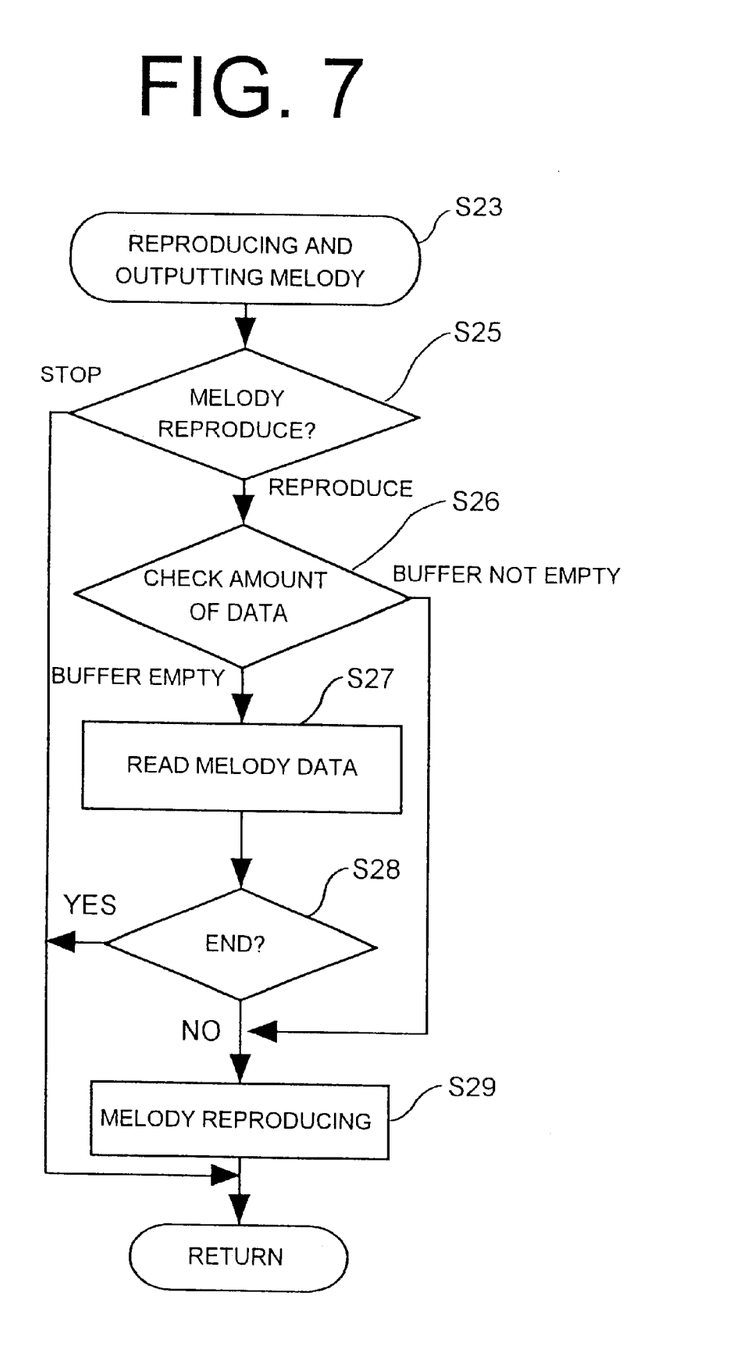
FIG. 7 is a flowchart showing the processing of reproducing and outputting the melody in detail.

As shown in FIG. 7, in the processing of reproducing and outputting the melody, initially, it is determined whether the fact that reproducing and outputting the melody should be executed is instructed on the input device 10 or not (Step S25). If the fact that reproducing and outputting the melody should be temporarily stopped is instructed (Step S25; STOP), the processing of Step S24 shown in FIG. 6 is executed, so that the processing is switched to standby state without reproducing is performed until the fact that reproducing and outputting the melody should be resumed is instructed.

On the other hand, if it is determined that the fact that reproducing and outputting the melody should be executed is instructed in the Step S25 (Step S25; reproducing), then it is determined whether the tune data is stored in the buffer memory of the RAM 8 (Step S26).

If the tune data is not stored in the buffer memory (Step S26; buffer empty), the melody can not be reproduced in this state, so that the tune data is read from the DVD-ROM disc DK or the hard disc HD through the DVD-ROM drive 11 or the HD drive 28, and stored in the buffer memory (Step S27).

Then, while reading and storing the tune data for a tune, it is always determined whether the fact that reproducing and outputting the melody should be continued is instructed on the input device 10 (Step S28). If it is determined that the fact that reproducing and outputting the melody should be ended is instructed (Step S28; YES), reproducing and outputting the melody is stopped and the processing of the Step S24 shown in FIG. 6 is executed.

On the other hand, if it is determined that the fact that reproducing and outputting the melody should be continued is instructed (Step S28; NO), reproducing and outputting the melody is actually executed by using the read tune data (Step S29). It is noted that reproducing and outputting the melody in the Step S29 is executed by transmitting the tune data every fixed period (for example, a couple of milliseconds) to the sound reproducing unit 18.

After that, the process in the Step S24 shown in FIG. 6 is executed, the above-mentioned processing is repeated.

[III] The Processing of Reproducing and Outputting the Melody with which the Processing of Guiding Route is Accompanied Finally, the processing of reproducing and outputting the melody with which the processing of guiding route executed as the navigation processing (namely, the navigation processing executed on the basis of the planned route previously set) is accompanied will be described with reference to FIG. 8.

Figure 8:
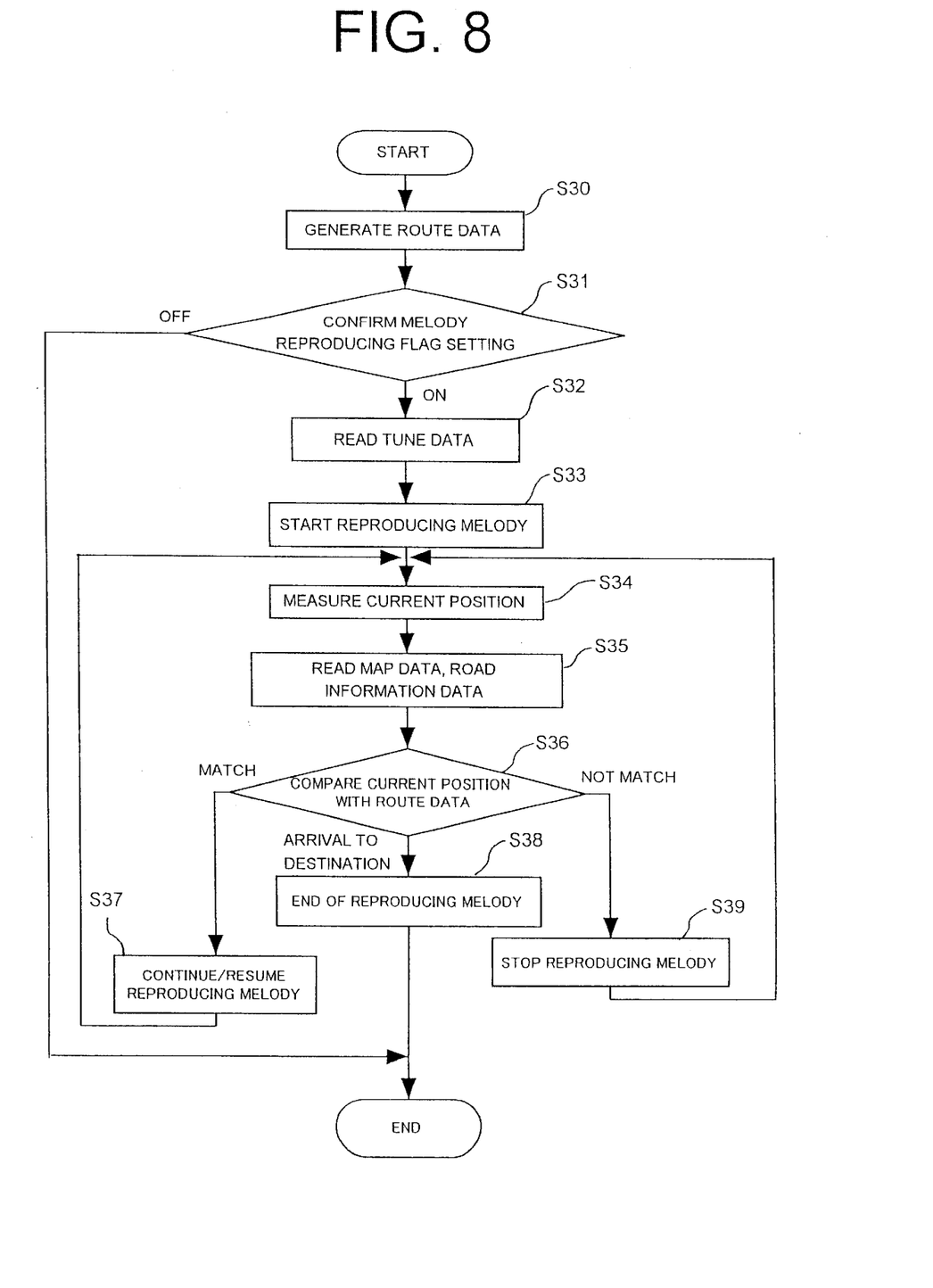
FIG. 8 is a flowchart showing the processing of guiding route.

FIG. 8 is a flowchart showing the processing of guiding route.

As shown in FIG. 8, in the processing of reproducing and outputting the melody with which the processing of guiding route is accompanied, initially, if the user sets a route on which he plans to travel in the future by using the input device 10, etc., route data indicating the set route is generated (Step S30).

After the route data is generated, then, it is determined whether the fact that reproducing and outputting the melody with which the processing of guiding route executed on the basis of the generated route data is accompanied should be executed is set for ON (see FIG. 5) or not (Step S31). If the reproducing and outputting of the melody is set for OFF (Step S31; OFF), the processing is ended. On the other hand, if the reproducing and outputting of the melody is set for ON (Step S31; ON), the tune data necessary to reproduce and output the melody is read from the DVD-ROM disc DK or the hard disc HD (Step S32). Then, the reproducing and outputting of the melody is started as in the case of the Step S23 (Step S33).

After that, measuring the current position of the vehicle is executed (Step S34). The processing of measuring the current position is executed on the basis of the angle speed data and the relative azimuth data outputted from the angle speed sensor 1, the travel distance data outputted from the travel distance sensor 2, and the GPS measuring data and the absolute azimuth data, mainly by the CPU 6 as in the case of the Step S15.

If the current position is measured, then the map data and the road information data corresponding to the road including the measured current position is read from the DVD-ROM disc DK or the hard disc HD by the DVD-ROM drive 11 or the HD drive 28, and displayed on the screen. Further, a position mark indicating the cur rent position is superimposed on the screen. In this manner, the processing of guiding route is executed (Step S35).

Then, it is determined whether the current position exists on the route or not by comparing the current position measured in the Step S34 with the route data set in the Step S30 (Step S36).

If the current position matches up with the route data and then it is determined that the current position exists on the route (Step S36; MATCH), the reproducing and outputting of the melody currently reproduced and outputted is continued or resumed (in the case that the reproducing and outputting of the melody are temporarily stopped in Step S39 described below) (Step S37). Then, returning to the Step S34, the above-mentioned processing is repeated.

On the other hand, in the Step S36, it is determined that the current position exists on a destination in the set route (Step S36; ARRIVE AT DESTINATION), the reproducing and outputting the melody is ended (Step S38), the processing of guiding route is ended as a whole.

On the other hand, if the current position does not match up with the route data and then it is determined that the current position is off the route (Step S36; NOT MATCH), the reproducing and outputting of the melody are temporarily stopped (Step S39). Then, returning to the Step S34, the above-mentioned processing is repeated.

As mentioned above, according to the process of reproducing and outputting the melody, while the processing of displaying the current position or the processing of guiding the route is executed, the melody corresponding to the contents of the processing is continuously outputted in the vehicle. Therefore, it is possible to ensure calling the user's attention to the route on which he should drive. In addition, the user can grasp guidance performed by the navigation processing only based on his sense of hearing.

The melody to be outputted is selected among the melodies corresponding to the tune data stored in the DVD-ROM disc DK or the hard disc HD, so that the user can freely select the melody to be outputted and make it output.

The condition of reproducing and outputting the melody can be set in the setting screen, so that the user can freely choose whether the navigation operation accompanied by the melody is executed or not.

The melody is outputted according to the road information about a road including the measured current position, so that the user can recognize which road the vehicle is traveling on based on his sense of hearing.

At that time, the melody corresponding to the species of a road on which the vehicle currently exists is outputted, so that the user can recognize in detail which road the vehicle is traveling on based on his sense of hearing.

The melody corresponding to information about the road including the current position, such as the state of regulation, a speed limit, etc., is outputted, so that the attention to the information about the road can be effectively attracted.

The melody is continuously outputted while the vehicle exists on the predetermined route, so that the user can recognize that the vehicle is traveling on the predetermined route without watching any map.

The output of sounds is stopped when the current position is not on the predetermined route, so that the user can promptly recognize that the vehicle is off the predetermined route.

In the above-mentioned embodiment, the melody is reproduced and outputted on the basis of the road information about the road including the current position or the predetermined route. In addition, for example, if each area included in map information and melodies expressing each area are recorded in the table file so that the melodies correspond to each area, the melody expressing the area where the vehicle is currently traveling (for example, a folk song, etc. in the area where the vehicle is currently traveling) can be outputted.

According to this constitution, the melody expressing the area where the vehicle is currently traveling is outputted, so that the user can promptly recognize the character of the area, etc.

If each intersection included in map information and melody to call the user's attention to the intersection are recorded in the table file so that the melody corresponds to the intersection, the melody to call the user's attention to the intersection can be reproduced and outputted when the vehicle approaches the intersection based on the measured current position.

According to this constitution, it is possible to call the user's attention to the fact that the vehicle approaches the intersection, so that safety at the time the vehicle travels in the intersection can be improved.

If each traveling speed of the vehicle and melody to call the user's step-by-step attention to the traveling speed are recorded in the table file so that the melody corresponds to the traveling speed, the faster the traveling speed, the melody to call the user's higher attention to the traveling speed can be reproduced and outputted based on detected traveling speed.

According to this constitution, the melody corresponding to the traveling speed is outputted, so that it is possible to effectively call the user's attention to an overspeed, etc.

If height of a place where the vehicle exists and melody corresponding to the height are recorded in the table file, the melody can be reproduced and outputted so that its tempo or volume varies according to change of the height-based on the height of a place where the vehicle exists detected by using height data obtained in the GPS receiver 3 or separately obtained by an altimeter, etc.

According to this constitution, sounds corresponding to the height are outputted, so that the user can recognize change of the height based on his sense of hearing.

If traveling azimuth of the vehicle and melody corresponding to the traveling azimuth are recorded in the table file, the melody can be reproduced and outputted so that its tempo or volume varies according to the traveling azimuth based on the traveling azimuth detected by using absolute azimuth data, etc. obtained in the GPS receiver 3.

According to this constitution, sounds corresponding to the traveling azimuth are outputted, so that the user can recognize which azimuth, four cardinal points, the vehicle is heading to, which azimuth a road leads (including determination whether a road is an up line or a down line) without watching any map based on his sense of hearing.

The navigation device can be provided not only as an individual navigation device but also a device using a personal computer which has a hard disc, for example. In this case, software executing the above-mentioned processing is run on the personal computer, so that the function of the present invention can be implemented.

Further, in the above-mentioned embodiment, the vehicle is used for an example of a movable body. However, the movable body is not limited to the vehicle. For example, the present invention can be used for an airplane, a boat, etc. Furthermore, if the navigation device is applied to a mobile device, such as a notebook-size personal computer, a mobile computer, a cellular phone, etc., a user can accurately find a present position while carrying it.

Moreover, if the navigation device is applied to a cellular phone, it is possible to change the melody corresponding to a place where the user of the cellular phone exists, such as a city, a town, a village, a street, an avenue, etc. According to this, for example, the navigation device can assist people having vision-impaired or hearing-impaire to travel from one place to another by using the melody.

Moreover, a main processing of the above-mentioned navigation operation can be executed in a navigation center build as a building. Then a result of the main processing can be transmitted to a terminal device having a display, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. H(Heisei) 11-367368 filed on Dec. 24, 1999 including the specification, claims, drawings and summary is incorporated herein by reference in its entirety.

What is claimed is:

1. A navigation apparatus which assists traveling of the movable body, comprising:
   a position detecting device for detecting a current position of the movable body;
   a route setting device for setting a route on which the movable body travels; and
   a sound outputting device for outputting a sound corresponding to the route at least while the movable body is traveling along the route, wherein the sound varies corresponding to a specific route being traveled.

2. The navigation apparatus according to claim 1 further comprising:
   a sound storing device for storing various kinds of sounds;
   a selecting condition setting device for setting a condition for selecting a sound to be outputted by the sound outputting device among the stored sounds; and
   a sound selecting device for selecting the sound when the condition set by the selecting condition setting device is satisfied.

3. The navigation apparatus according to claim 1, further comprising
   a outputting condition setting device for setting a condition for outputting a sound by the sound outputting device,
   wherein the sound outputting device continuously outputs the sound for a period of time during which the condition set by the outputting condition setting device is satisfied.

4. The navigation apparatus according to claim 1, wherein the sound outputting device varies the sound in accordance with the current position detected by the position detecting device.

5. The navigation apparatus according to claim 2, further comprising
   a road type detecting device for detecting a type of road including the detected current position,
   wherein the selecting condition setting device sets the condition that the detected type of road matches up with at least a predetermined type of road, and
   the sound selecting device selects the sound corresponding to the detected type of road.

6. The navigation apparatus according to claim 2, further comprising
   a road information detecting device for detecting information about road including the detected current position,
   wherein the selecting condition setting device sets the condition that the detected information about road matches up with at least a predetermined information about road, and
   the sound selecting device selects the sound corresponding to the detected information about road.

7. The navigation apparatus according to claim 2, further comprising
   an area detecting device for detecting an area including the detected current position,
   wherein the selecting condition setting device sets the condition that the detected area matches up with at least a predetermined area, and
   the sound selecting device for selecting the sound corresponding to the detected area.

8. The navigation apparatus according to claim 2, further comprising
   an intersection detecting device for detecting an intersection,
   wherein the selecting condition setting device sets the condition that the detected intersection is close to the detected current position, and
   the sound selecting device selects the sound attracting attention to the detected intersection.

9. The navigation apparatus according to claim 2, further comprising
   a speed detecting device for detecting a speed of the movable body,
   wherein the selecting condition setting device sets the condition that the detected speed matches up with at least a predetermined speed, and
   the sound selecting device selects the sound corresponding to the detected speed.

10. The navigation apparatus according to claim 2, further comprising
    an altitude detecting device for detecting an altitude of a place where the movable body exists,
    wherein the selecting condition setting device sets the condition that the detected altitude matches up with at least a predetermined altitude, and
    the sound selecting device selects the sound corresponding to the detected altitude.

11. The navigation apparatus according to claim 2, further comprising
    a traveling azimuth detecting device for detecting a traveling azimuth of the movable body,
    wherein the selecting condition setting device sets the condition that the detected traveling azimuth matches up with at least a predetermined traveling azimuth, and
    the sound selecting device selects the sound corresponding to the detected traveling azimuth.

12. The navigation apparatus according to claim 1, wherein the sound outputting device stops outputting the sound when the movable body is traveling off the route.

13. A navigation method for assisting traveling of the movable body, comprising the processes of:

detecting a current position of the movable body;

setting a route on which the movable body travels; and outputting a sound corresponding to the route at least while the movable body is traveling along the route, wherein the sound varies corresponding to a specific route being traveled.

14. The navigation method according to claim 13, further comprising the processes of:

storing various kinds of sounds;

setting a condition for selecting a sound to be outputted among the stored sounds; and selecting the sound when the set condition is satisfied.

15. The navigation method according to claim 13, further comprising the process of setting a condition for outputting the sound, wherein the process of outputting the sound continuously outputs the sound for a period of time during which the set condition set is satisfied.

16. The navigation method according to claim 13, wherein the process of outputting the sound varies the sound in accordance with the detected current position.

17. The navigation method according to claim 14, further comprising the process of detecting a type of road including the detected current position, wherein the process of setting the condition for selecting the sound sets the condition that the detected type of road matches up with at least a predetermined type of road, and the process of selecting the sound selects the sound corresponding to the detected type of road.

18. The navigation method according to claim 14, further comprising the process of detecting information about road including the detected current position, wherein the process of setting the condition for selecting the sound sets the condition that the detected information about road matches up with at least a predetermined information about road, and the process of selecting the sound selects the sound corresponding to the detected information about road.

19. The navigation method according to claim 14, further comprising the process of detecting an area including the detected current position, wherein the process of setting the condition for selecting the sound sets the condition that the detected area matches up with at least a predetermined area, and the process of selecting the sound selects the sound corresponding to the detected area.

20. The navigation method according to claim 14, further comprising the process of detecting an intersection, wherein the process of setting the condition for selecting the sound sets the condition that the detected intersection is close to the detected current position, and the process of selecting the sound selects the sound attracting attention to the detected intersection.

21. The navigation method according to claim 14, further comprising the process of detecting a speed of the movable body, wherein the process of setting the condition for selecting the sound sets the condition that the detected speed matches up with at least a predetermined speed, and the process of selecting the sound selects the sound corresponding to the detected speed.

22. The navigation method according to claim 14, further comprising the process of detecting an altitude of a place where the movable body exists, wherein the process of setting condition for selecting the sound sets the condition that the detected altitude matches up with at least a predetermined altitude, and the process of selecting the sound selects the sound corresponding to the detected altitude.

23. The navigation method according to claim 14, further comprising the process of detecting a traveling azimuth of the movable body, wherein the process of setting the condition for selecting the sound sets the condition that the detected traveling azimuth matches up with at least a predetermined traveling azimuth, and the process of selecting the sound selects the sound corresponding to the detected traveling azimuth.

24. The navigation method according to claim 13, wherein the process of outputting the sound stops outputting the sound when the movable body is traveling off the route.

25. The navigation apparatus which assists traveling of the movable body according to claim 1, wherein the sound outputting device continuously outputs a sound corresponding to the route at least while the movable body is traveling along the route.

26. The navigation method for assisting traveling of the movable body according to claim 13, wherein the process of outputting a sound continuously outputs a sound corresponding to the route at least while the movable body is traveling along the route.

* * * * *